Dec. 31, 1929.  J. SCHERMULY  1,741,794
LISTER
Filed Oct. 1, 1928  5 Sheets-Sheet 1

INVENTOR.
Joseph Schermuly
BY William C. Edwards
ATTORNEY.

INVENTOR.
Joseph Schermuly
BY William C. Edwards
ATTORNEY.

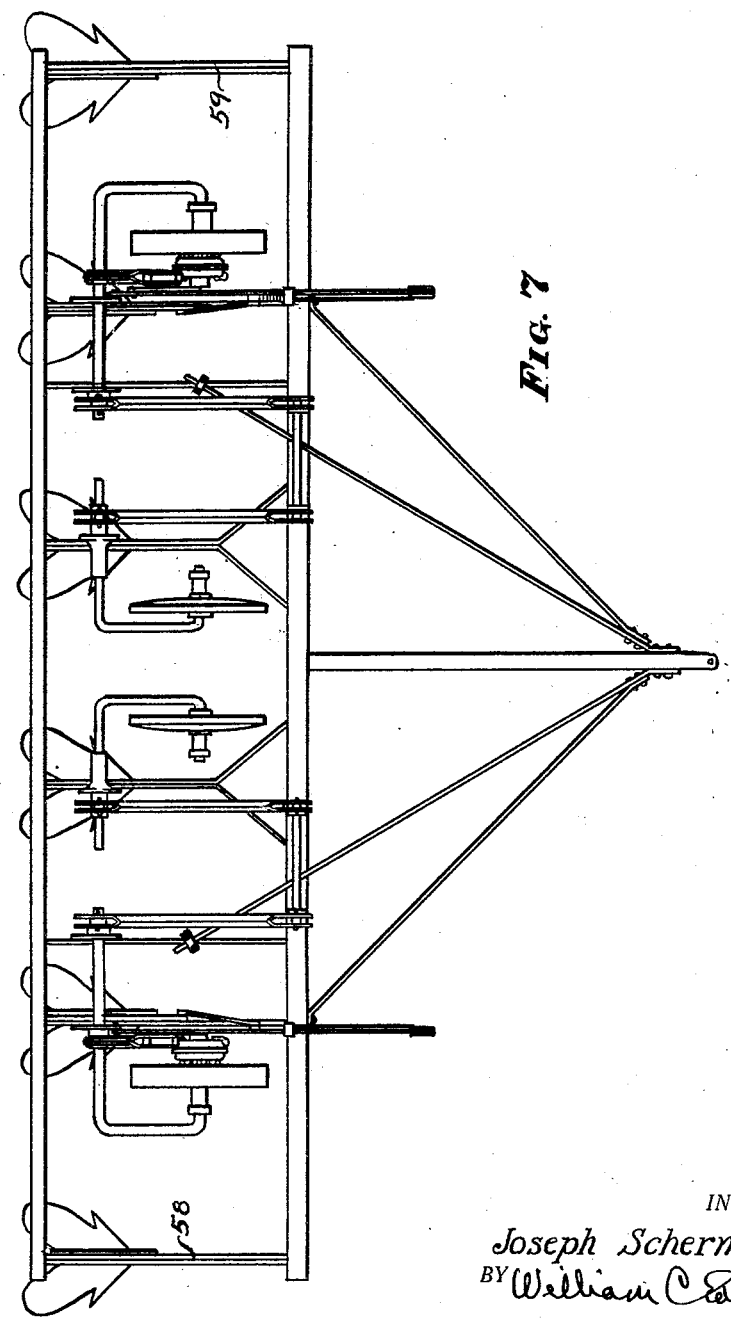

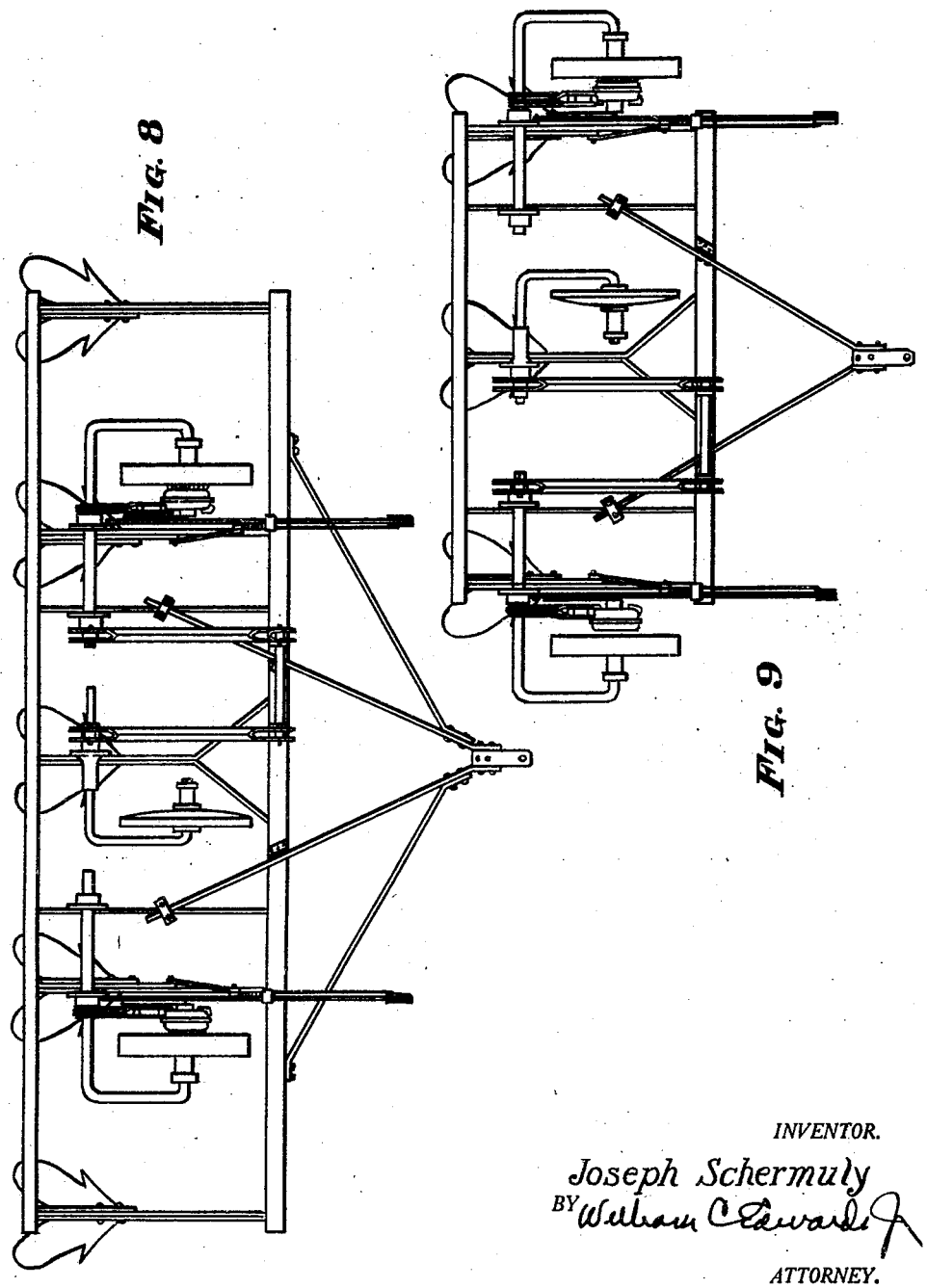

Patented Dec. 31, 1929

1,741,794

UNITED STATES PATENT OFFICE

JOSEPH SCHERMULY, OF WICHITA, KANSAS

LISTER

Application filed October 1, 1928. Serial No. 309,565.

The invention relates to an agricultural implement known as a lister, having a plurality of plow elements and showing the usual power lifting means for raising the plows out of the ground and with which is associated means by which certain plow elements may conform to varied ground levels and to best perform the function of listing. One of the objections to listing is that all plows are set so as to plow to a predetermined depth without making allowance for the fact that the ground may vary considerably in the width of the outfit, consequently one plow may just skim the surface while others equally set for depth are plowing at the proper depth or even at a greater depth. By means of my invention this defect is completely overcome.

Figure 1:
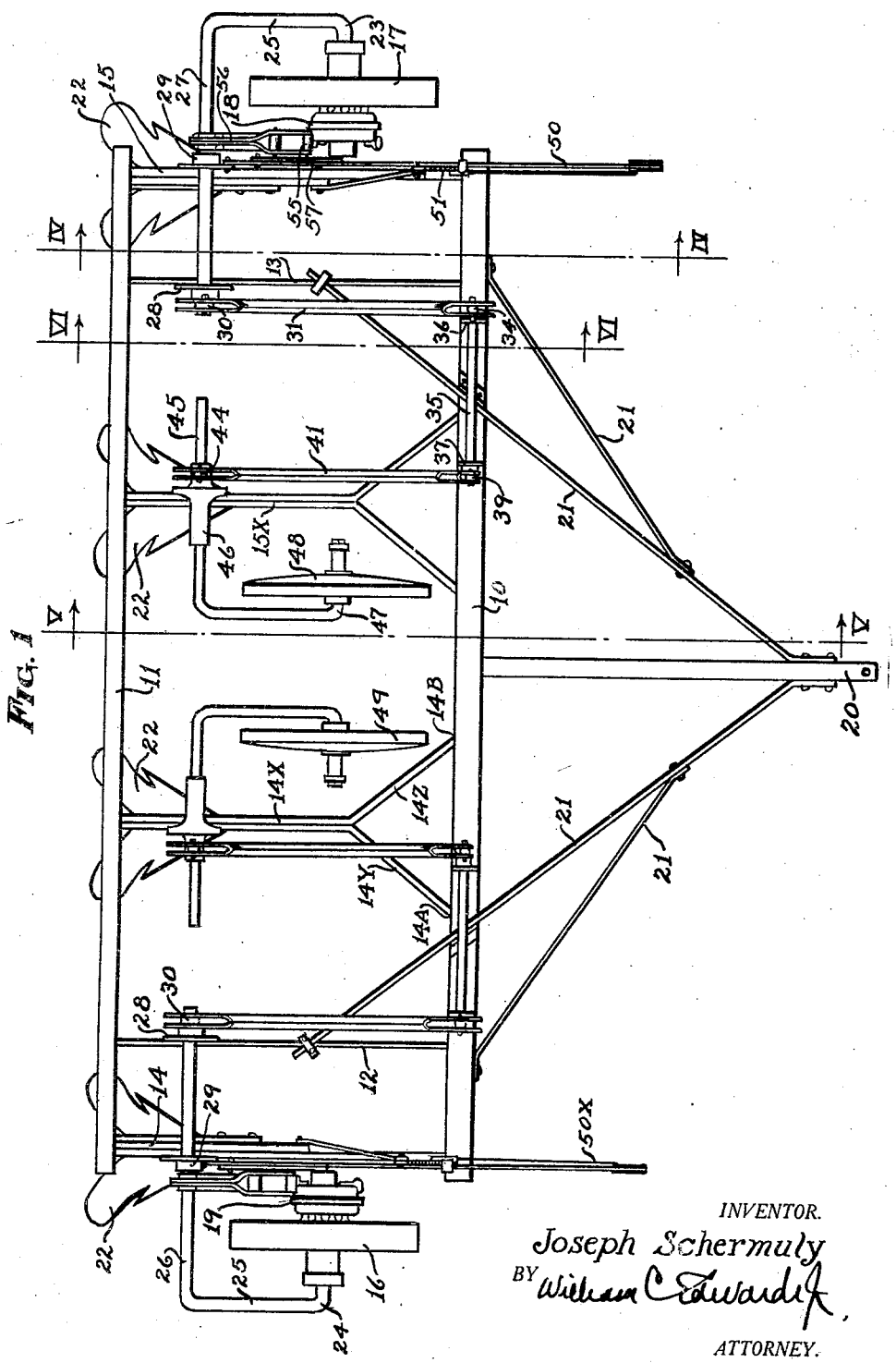
Figure 2:
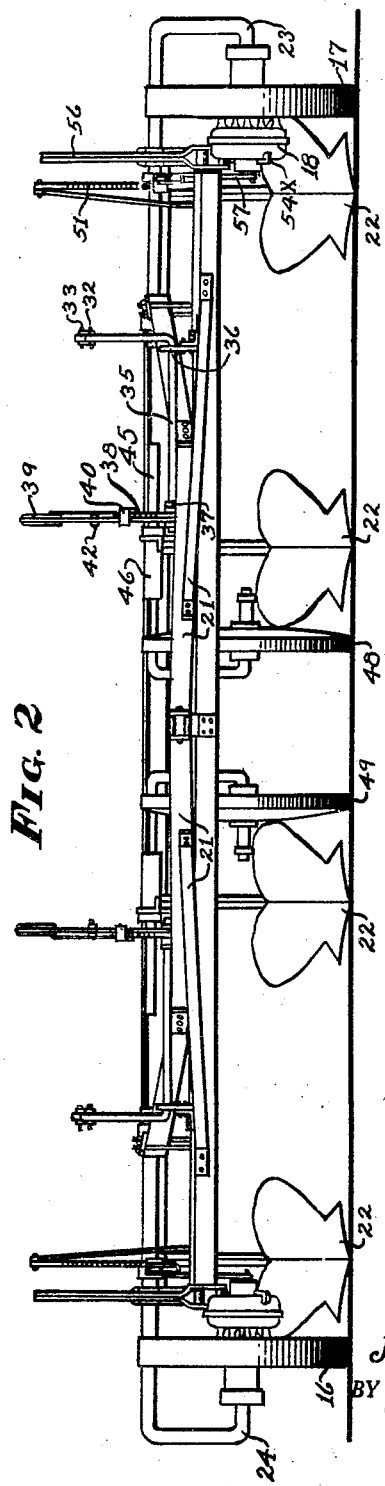
Figure 3:
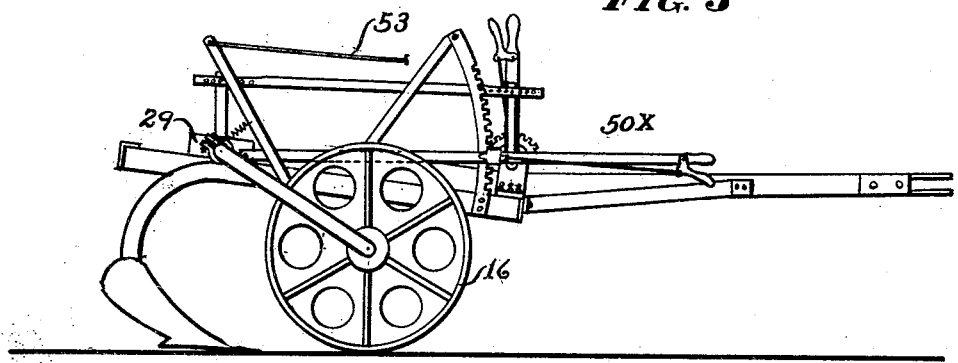
Figure 4:
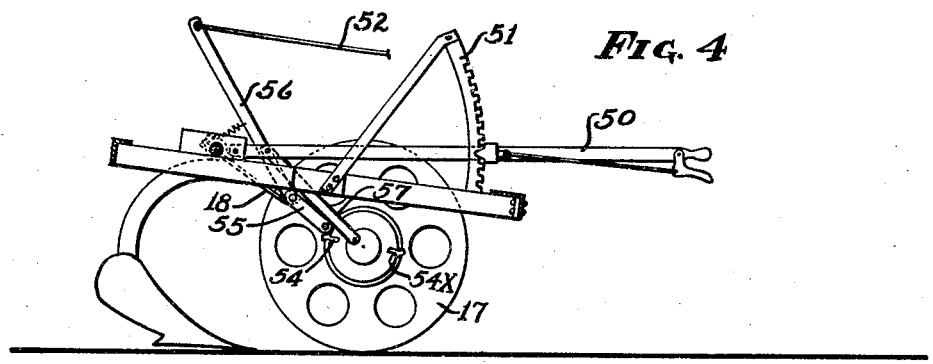
Figure 5:
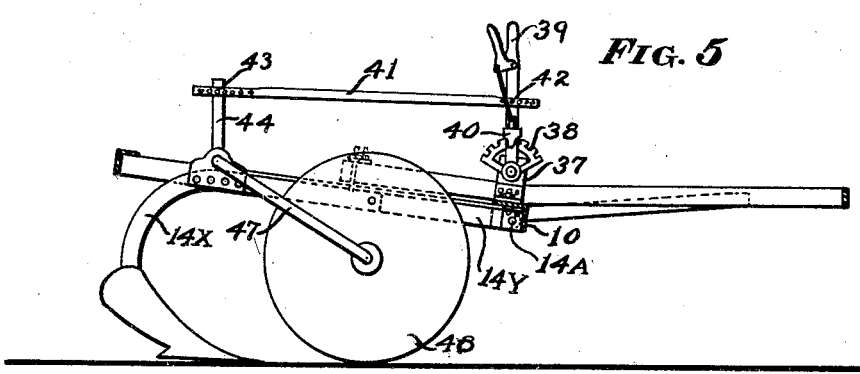
Figure 6:
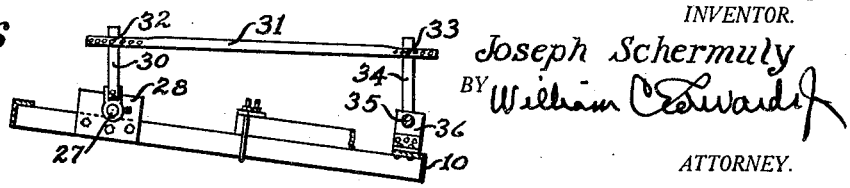

In the drawings; Fig. 1 shows a plan view of my four row lister. Fig. 2 is a front view of Fig. 1. Fig. 3 is a left end view of Fig. 1. Fig. 4 shows a sectional view as taken along the line IV—IV in Fig. 1 and looking in the directions of the arrows. Fig. 5 shows a sectional view taken along the line V—V Fig. 1 and looking in the direction of the arrows. Fig. 6 shows a sectional view as taken along the line VI—VI Fig. 1 and looking in the directions of the arrows. Fig. 7 shows a plan view of my six row lister. Fig. 8 shows a plan view of my five row lister. Fig. 9 shows a plan view of my three row lister. Similar numerals of reference indicate corresponding parts throughout all the figures of the drawings.

Referring to the drawings; at 10 is seen the front member of the frame of the lister. At 11 is the back frame element connected by cross frame elements 12 and 13 to the front member 10. The outer plow beams 14 and 15 rigidly connect between the front and back frame members 10 and 11. The inner plow members $14^x$ and $15^x$ in Fig. 1 do not connect to the back member 11 but fork as at $14^y$ and $14^z$ and pivotally connect as at $14^a$ and $14^b$ to the member 10. At 16 and 17 are the main wheels of the lister and associated therewith are the power lifting means indicated at 18 and 19. At 20 is the tongue of the lister and at 21 are seen tie members connecting the tongue to the frame elements. At 22 are seen the lister plows. Axles such as 23 and 24 for the wheels 17 and 16 bend as at 25 thence as at 27 and 26 as a straight shaft mounted in bearings 28 and 29 on frame elements. The power lifting means such as 18 connect to the shaft 27. A lever 30 is rigid to the end of the shaft 27 and adjustably connects to the tie bar 31 at 32 and at 33 connects to a lever 34 for operating the horizontal jack shaft 35, mounted in the bearings 36 and 37 on the frame 10. At the end of the shaft 35 is a ratchet 38 and a lever 39 having a keeper 40 and engages adjustably the ratchet 38. A tie bar 41 connects at 42 to the lever 39 and at 43 to the arm 44 of the horizontal portion 45 of the curved shaft 47 carrying the wheel 48 for the plow $15^x$. At 46 is a bearing for the shaft 45 as mounted on the beam $15^x$. The wheels 17 and 48 are paired together by this linkage. Also, the wheels 16 and 49 are linked in a similar fashion to that just described for wheels 17 and 48. The handle 50 of the lever seen in Fig. 4 operates in conjunction with the segment 51 to raise or lower the wheel 17 with respect to the frame 10—11 so as to position the plow 22 on the beam 15 at a proper depth in or to raise it out of the ground. Lever $50^x$ serves a similar purpose for beam 14 and its plow. Cables such as 53 and 52 function for the power lifting device. In Fig. 4 is seen the dog 54 and the companion dog $54^x$ which engage the element 55 linked to the lever 56 and actuated by the cable 52. At 57 is a tie for the power lift. The wheels 48 and 49 may thus follow their own ground line since their plow beam such as $14^x$ Fig. 5 can pivot as at $14^a$, the bar 41 adjusting to a proper position and angle at the points 42 and 43 to allow for ground variations. In Fig. 7 the outer plow beams 58 and 59 are rigid to the frame the inner elements being as indicated in Fig. 1. Figs. 8 and 9 illustrate how the four plow assembly can be increased or decreased one plow element if desired.

Such modifications may be employed as lie within the scope of the appended claims.

Having fully described my invention, what

I now claim as new and desire to secure by Letters Patent is:

1. In a lister, a main frame; a pair of main ground wheels and power lifting means associated therewith; a plow beam and plow for each main wheel; a curved shaft as an axle element for a main wheel with a portion carried by bearings on the frame; a lever for the end of said shaft; a tie bar leading from the lever and a second lever connecting thereto; a jack shaft carried by the main frame and rigid to the second lever; a ratchet at the other end of the jack shaft; a third lever adjustably engaging the ratchet and a tie bar carried from said third lever and an arm on a wheel axle shaft linked thereto and an inner wheel and a plow mechanism associated therewith.

2. In a lister as described in claim 1; said axle shaft carrying the wheel of an inner plow element, the shaft having a bearing on the beam of said plow and said plow beam making a pivotal connection to the forward frame element of the lister.

In testimony whereof I affix my signature.

JOSEPH SCHERMULY.